July 10, 1956 L. M. BALLARD 2,753,980
ATTACHMENT OF ELEMENTS TO FLEXIBLE CONVEYOR BELTS
Filed Dec. 22, 1952
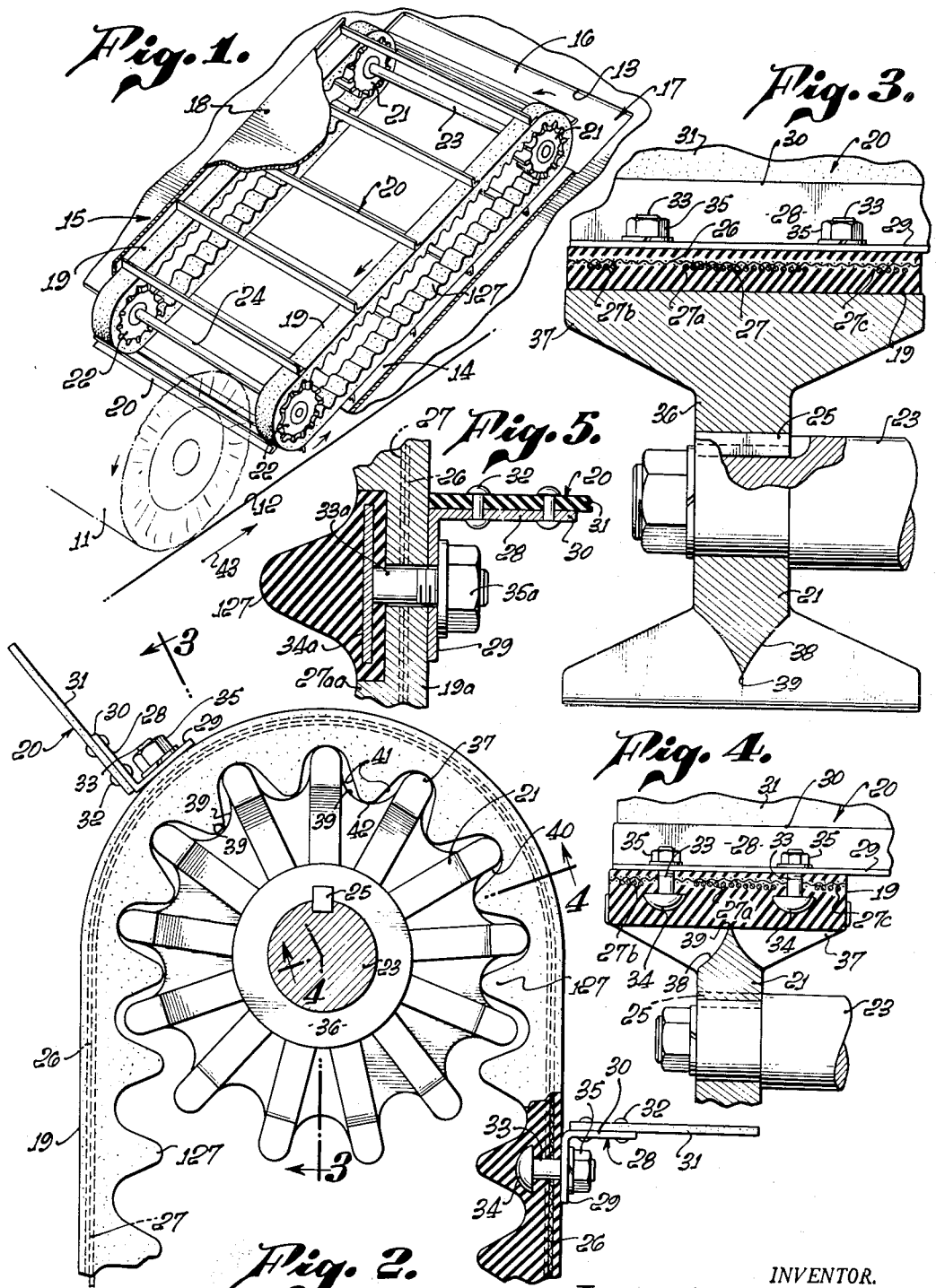
INVENTOR.
LOUIS M. BALLARD,
BY
ATTORNEY.

United States Patent Office 2,753,980
Patented July 10, 1956

2,753,980

ATTACHMENT OF ELEMENTS TO FLEXIBLE CONVEYOR BELTS

Louis M. Ballard, Duarte, Calif., assignor to Wayne Manufacturing Company, Pomona, Calif., a corporation of California Application December 22, 1952, Serial No. 327,394

12 Claims. (Cl. 198—174)

This invention relates to improved endless conveyors of a type particularly adapted in certain respects for use in street sweeping machines. This application is a continuation-in-part of my copending application Serial No. 263,089, filed December 24, 1951, on "Sweeper Conveyor."

A street sweeping machine embodying the invention includes a collection chamber within which debris taken from the street is accumulated, and an inclined endless conveyer acting to elevate debris from a level near the street into the chamber. The conveyor comprises one or more endless flexible belts, and a number of elements projecting from and movable with the belts to engage the debris and advance it upwardly along an inclined ramp into the collection chamber. The conveyor belt or belts preferably are provided with a series of teeth along one side to mesh with and be positively driven by associated sprocket wheels.

An important object of the invention is to provide, in a conveyor of the above or a similar character, improved means for mounting the debris or work engaging elements to the conveyor body, in a manner assuring completely effective retention and positioning of the elements during operation of the conveyor. Particularly contemplated is a type of mounting adapted to minimize the extent to which the work engaging elements may be deflected relative to the conveyor body by the resistance of the debris being handled.

In accordance with the invention, I employ for mounting each of the work engaging elements to the conveyor body a special mounting element which extends directly into, and is preferably anchored securely within, the material of the flexible conveyor body. The flexible body may be formed of rubber, and the mounting element may comprise a rigid metallic member embedded in and vulcanized to the rubber. In order to assure most effective mounting and most accurate positioning of the work engaging elements relative to the body, I prefer to employ a type of belt body having at one of its sides a series of teeth for meshing with a driving sprocket wheel, and to then form each of the mounting elements to extend into and be anchored within one of the teeth. These teeth, like the rest of the belt body, may be formed of rubber, and the mounting elements may comprise bolts or studs having enlarged heads embedded in and bonded to the rubber teeth. The employment of such mounting elements anchored directly to the teeth of the belt has proven especially effective in positioning the work engaging elements during the portions of their travel when the belt is engaged by a sprocket wheel, since the teeth are then positively held by the teeth of the wheel, and the mounting elements attached to the teeth are therefore also positively positioned. In one form of the invention, each of the teeth to which a mounting element is secured is formed separately from and removably attached to the belt body.

Further features of the invention have to do with a special formation of the interengaging teeth of the sprocket wheel and belt, in a manner to prevent the accumulation of dirt and debris between those teeth. In particular, I prevent such dirt accumulation by forming one of the interengaging parts to be of such open formation as to permit any debris trapped between the members to freely escape. For this purpose, the portions of one of the parts, preferably the sprocket wheel, between its successive teeth may have transverse dimensions substantially smaller than the teeth themselves, to form alongside those portions a number of passages or openings through which debris may escape from the spaces between the teeth of that member. Also, these inter-tooth portions are desirably formed to taper transversely of the wheel to relatively sharp edges, in a manner to cut any dirt mass which may be present into two pieces and then displace the two pieces in opposite directions and out of the space between the wheel and belt.

The above and other features and objects of the present invention will be better understood from the following detailed description of the typical embodiment illustrated in the accompanying drawings, in which:

Fig. 1 is a fragmentary perspective view of a street sweeping machine embodying the invention, the outer portions of the machine being broken away to reveal the inner debris elevating conveyor;

Fig. 2 is an enlarged fragmentary side view of one of the conveyor belts, the associated debris engaging elements, and one of the belt driving sprocket wheels;

Fig. 3 is an axial section through the belt and sprocket wheel of Fig. 2, taken along line 3—3 of that figure;

Fig. 4 is a fragmentary section taken on line 4—4 of Fig. 2; and

Fig. 5 is a section through a variational type of mounting for attaching the debris engaging units to the flexible belts.

Fig. 1 represents fragmentarily a street sweeping machine, and particularly certain of its sweeping and debris handling parts. The portions of the machine which are not shown are of conventional construction. The machine comprises a motor vehicle having a rear horizontally extending rotary brush 11 which extends transversely of the path of movement of the vehicle, and is positioned to engage a street surface 12 and sweep debris forwardly from the street surface onto the lower portion of an inclined elevator ramp 14. This ramp may be formed of sheet metal and preferably extends substantially entirely across the transverse extent of the street sweeping machine. The debris is advanced upwardly along ramp 14 by an elevator conveyor assembly generally indicated at 15, and falls from an upper end 16 of the ramp through an opening 13 into a debris accumulating chamber 17 at the forward end of the machine. The space within which conveyor 15 is contained is closed along the upper side and upper end of the conveyor by a sheet metal wall or partition which is fragmentarily represented at 18.

The conveyor 15 includes a pair of laterally spaced, parallel, endless belts 19 positioned at opposite sides of the vehicle and inclined at an angle corresponding to the inclination of ramp 14. For advancing debris upwardly along ramp 14, a number of debris engaging units 20 extend horizontally between corresponding portions of belts 19, and move upwardly along the upper surface of ramp 14 in correspondence with the belt movements.

The upper and lower ends of the belts extend about upper and lower sprocket wheels 21 and 22, the two upper sprocket wheels being mounted to opposite end portions of a first shaft 23, and the two lower sprocket wheels being mounted to opposite end portions of a second shaft 24. Each of the four sprocket wheels is suitably keyed to the associated shaft, as by key 25 of Figs. 2 and 3, to maintain the two belts in unison at all times. One or both of the shafts 23 and 24 are driven, as by a suitable chain and sprocket drive (not shown), in a direction causing angularly upward advancement of the lower extents of belts 19, and downward movement of the upper extents of those belts.

Each of belts 19 comprises an elongated endless flexible body, whose lateral width is preferably greater than its thickness. This belt body is desirably formed of a resilient deformable material, as for instance a suitable strong but flexible rubber, which is desirably reinforced by one or more plies of woven fabric 26 (see Figs. 2 and 3) embedded in and extending along the entire length of the belt body. Also, each belt is preferably further reinforced by one or more wires 27 extending longitudinally within the belt along its entire lineal extent, typically at a location directly adjacent fabric 26. Wires 27 may comprise cables each formed of a plurality of individual wires twisted together. For best reinforcement, it has been found desirable to provide several circular lengths of the reinforcing cable at a transversely central location 27a within the belt and several additional lengths of cable at two side locations 27b and c. At each of these locations, the several lengths of cable may comprise a single cable wound several times about the circular length of the belt. At its inner side, each belt presents a series of transversely extending spaced teeth 127 for engaging the sprocket wheels 21 and 22. In the Figs. 1–4 form of the invention, these belts teeth 127 are formed integrally with the resilient rubber body of the belt.

Each of the transverse debris engaging units 20 includes a transversely extending elongated angle iron 28, having an inner portions 29 extending transversely across the outer surfaces of the two belts, and an outwardly projecting portion 30 to which is mounted a flexible transversely extending sheet-like squeegee element 31. The squeegee element 31 may be formed of a suitable resilient rubber, and projects into engagement with ramp 14 in order to wipe debris upwardly along the ramp as the belts are driven. Squeegee 31 may be attached to angle iron 28 in any suitable manner, as by rivets 32.

Each of the angle irons 28 is fastened at its opposite ends to corresponding portions of the two belts 19 by pairs of mounting bolts or studs 33. The two bolts at each end of each angle iron extend directly into and are embedded deeply within and bonded to the material of one of the belts. Preferably, the bolts extend into the portions of the belt bodies forming some of the teeth 27, and are vulcanized to the rubber of the belt and teeth, as by curing the rubber while the bolts are contained within it. The bolts may have enlarged heads 34 within the belt bodies, and desirably within the teeth, for assuring positive retention of the bolts by the rubber belts. At their outer ends, bolts 33 carry nuts 35, which are tightened against the angle iron to securely fasten the debris engaging squeegees to the belts.

As best seen in Figs. 2 to 4, the sprocket wheels 21 and 22 are of a special formation to assure effective transmission of driving force to the belts, while at the same time preventing the accumulation of dirt or other debris within the inter-tooth recesses of the wheels. Each of the sprocket wheels has a hub portion 36 of relatively small transverse dimension, carrying a series of circularly spaced belt engaging teeth 37 of a width considerably greater than the hub. The width of teeth 37 desirably corresponds to the width of belts 19 (see Fig. 3). Between teeth 37, the sprocket wheel hub terminates outwardly in a number of intermediate inwardly recessed portions 38 having dimensions transversely of the wheel substantially smaller than the teeth. These inter-tooth portions of the wheel desirably taper radially outwardly and transversely of the wheel from the hub width to a relatively sharp outer knife edge 39. As best seen in Fig. 4, this knife edge serves to cut into two portions any mass of dirt or debris trapped between the belt teeth and the inter-tooth portions 38 of the sprocket wheel and to then displace the two masses of debris in opposite directions from between the belt and wheel.

At opposite sides of these inter-tooth portions 38 of the wheel, teeth 37 are spaced apart along their entire radial extends, to form between their radially inner portions a number of openings or passages 40 through which debris may escape radially inwardly from the spaces between teeth. It is also noted that even at the smallest portions of the inter-tooth recesses of the sprocket wheel, i. e. at the locations of knife edges 39, these recesses preferably have areas greater than the belt teeth (see Fig. 2), so that the belt teeth are spaced from the sprocket wheel along their sides 41, to further assure against difficulties resulting from the presence of debris between the belt and sprocket wheel. The belt teeth may however be formed to directly engage the sharp edges 39 of the sprocket wheel at the peaks 42 of the teeth, to assure an effective cutting of the debris mass into two parts.

In use, the street sweeping machine moves in the direction of the arrow 43 in Fig. 1, with brush 11 and conveyor 15 being continuously driven by the engine of the vehicle. Brush 11 sweeps debris forwardly onto the lower portion of ramp 14, and endless conveyor 15 then advances the debris upwardly along ramp 14 and into chamber 17.

The debris moving along ramp 14 is directly engaged and advanced by squeegee elements 31. The special mounting of bolts 33 to the belts, as shown in Figs. 3 and 4, positively positions the squeegees in their desired outwardly projecting positions, and prevents unwanted deflection of the squeegees relative to the belts under the influence of the debris being elevated. If the belts are formed of a resilient material, they are capable of being slightly deformed by engaged debris in a manner minimizing wear on the belts and assuring a much longer useful life than where other belt materials are used.

Fig. 5 shows fragmentarily a variational form of the invention, and particularly a second manner of attaching the debris engaging units to the belts. In this figure, I have shown at 19a a belt which is in every respect the same as belts 19 of Fig. 1, except that certain of the teeth 127 are formed separately from the belt body. These separately formed removable teeth 127 are preferably formed of the same type of resilient material, desirably rubber, as the belt body and other teeth 27aa, and are employed for anchoring the desbris engaging units to the belts. The bolts or studs 33a for mounting angle irons 28a and their carried squeegees 31 extend into and are vulcanized to these removable teeth. Two such studs may extend into each removable tooth and be attached to a rigid metal plate or enlarged head member 34a, which may extend across the major portion of the transverse extent of the belt. Studs 33a extend through openings 45 in the belt body 19a, for attachment by units 35a to the angle irons. As in the first form of the invention, two belts are attached to opposite ends of the angle irons.

I claim:

1. A sprocket wheel comprising a body adapted to be mounted for rotation and including a hub and a series of teeth carried at locations spaced about and having transverse dimensions substantially greater than the hub, said body having portions between said teeth tapering radially outwardly and transversely of the body from a transverse dimension corresponding substantially to that of the hub to a substantially sharp edge, whereby said tapering portion of the body cuts in two and displaces toward opposite sides of the wheel material trapped between the wheel and a meshing member.

2. A conveyor comprising an endless flexible belt having along a first side thereof a series of spaced teeth engageable with a sprocket wheel, said belt and teeth being formed of rubber, a work engaging unit carried at a side of said belt opposite said first side and including a transverse angle iron having a base portion adjacent the belt and a second portion projecting outwardly therefrom, a bolt for attaching said angle iron to the belt, said bolt extending through said base portion of the angle iron and into said rubber, and means forming a rigid enlargement attached to an inner end of said bolt and embedded in and bonded to said rubber at the location of one of said teeth, most of said rubber teeth being formed integrally with the rubber of said belt.

3. A sprocket wheel comprising a rotatable wheel body having about its periphery a series of spaced teeth and intermediate portions circularly between said teeth tapered radially outwardly and transversely of the body to displace engaged debris laterally, the transverse dimensions of said teeth being at least twice as great as the transverse dimensions of said tapering portions of the body at their bases to provide passages adjacent said tapering portions through which the debris may pass essentially radially inwardly from between the teeth.

4. Apparatus comprising an endless flexible toothed belt, means including a sprocket wheel mounting and driving said belt, and work engaging elements projecting from and movable with said belt, said sprocket wheel comprising a rotatable wheel body having about its periphery a series of spaced teeth and a series of intermediate portions between the teeth tapering radially outwardly and transversely of the wheel to displace to opposite sides of the wheel debris trapped between the wheel and belt, the transverse dimensions of said tapering portions of the body at their bases being smaller than the transverse dimensions of said teeth and belt to provide passages leading radially inwardly from between said teeth at opposite sides of said intermediate portions of the body to allow free escape of said debris.

5. Apparatus comprising an endless flexible belt having teeth spaced therealong, and a sprocket wheel engaging said belt and having about its periphery a series of spaced teeth and intermediate portions between said teeth tapering radially outwardly and transversely of the wheel, the transverse dimensions of said tapering portions of the wheel at their bases being smaller than the transverse dimensions of said teeth of the sprocket wheel to provide passages through which the debris may pass essentially radially inwardly from between the teeth, said tapering portions of the wheel having peaks which substantially engage the peaks of said belt teeth but are spaced from the belt teeth at locations adjacent but offset from said peaks thereof.

6. A conveyor comprising an endless flexible rubber belt including an endless flexible rubber body and a series of rubber teeth spaced along an inner side of said body and engageable with a sprocket wheel, most of said teeth of the belt being formed integrally with said rubber body of the belt, a work engaging unit carried at an outer side of said belt, a rigid element for attaching said unit to said belt having an outer end projecting outwardly from the belt for attachment to said unit, said element having an inner end extending into the rubber of said belt, and means forming a rigid enlargement attached to said inner end of said element and embedded in and bonded to the rubber of the belt at the location of one of said teeth.

7. A conveyor as recited in claim 6, in which said rigid enlargement extends across the major portion of the transverse extent of said one tooth at which said element is located.

8. A conveyor as recited in claim 6, in which said element is formed of metal, and said outer end thereof is threaded, there being a nut received on said threaded outer end of said element for attaching said unit thereto.

9. A conveyor as recited in claim 6, in which said one tooth at the location of said element is formed integrally with the belt.

10. A conveyor as recited in claim 6, in which said one tooth is formed separately from said body of the belt, and said enlargement is embedded in said one removable tooth.

11. A conveyor as recited in claim 6, including flexible reinforcing embedded in the rubber of said belt, said element extending into the rubber of the belt past said reinforcing, and said enlargement being contained in the rubber of the belt inwardly of said reinforcing.

12. A conveyor comprising an endless flexible rubber belt including an endless flexible rubber body and a series of rubber teeth spaced along an inner side of the body and engageable with a sprocket wheel, wire extending longitudinally within and reinforcing said belt, woven fabric extending longitudinally within and reinforcing said belt, and work engaging units carried by said belt and projecting from an outer side of the belt, said work engaging units including mounting elements extending into the rubber of the belt past the locations of said fabric and wire, and a rigid enlargement attached to an inner end of said belt and embedded in and bonded to said rubber at the location of one of said teeth, and inwardly beyond said wire and fabric, most of said rubber teeth being formed integrally with the rubber of said belt body.

References Cited in the file of this patent

UNITED STATES PATENTS

| | | |
|---|---|---|
| D. 29,142 | Dunn | Aug. 2, 1898 |
| 870,044 | Nettenstrom | Nov. 5, 1907 |
| 956,520 | Frase | May 3, 1910 |
| 1,758,484 | Van Slyke | May 13, 1930 |
| 1,855,808 | Schwann | Apr. 26, 1932 |
| 2,593,284 | Ewell | Apr. 15, 1952 |

FOREIGN PATENTS

| | | |
|---|---|---|
| 770,320 | France | June 25, 1934 |